United States Patent [19]

Hihara et al.

[11] Patent Number: 5,756,690
[45] Date of Patent: May 26, 1998

[54] RED REACTIVE DYES, THEIR COMPOSITIONS AND DYEING METHOD EMPLOYING THEM

[75] Inventors: Toshio Hihara; Yousuke Takahashi, both of Kitakyushu, Japan

[73] Assignee: DyStar Japan Ltd., Osaka, Japan

[21] Appl. No.: 639,332

[22] Filed: Apr. 25, 1996

Related U.S. Application Data

[62] Division of Ser. No. 400,934, Mar. 9, 1995, Pat. No. 5,545,236, which is a division of Ser. No. 279,006, Jul. 22, 1994, abandoned.

[30] Foreign Application Priority Data

| Aug. 23, 1919 | [JP] | Japan | 5-229439 |
| Aug. 2, 1993 | [JP] | Japan | 5-209914 |
| Sep. 30, 1993 | [JP] | Japan | 5-267887 |
| Oct. 25, 1993 | [JP] | Japan | 5-288670 |
| Oct. 25, 1993 | [JP] | Japan | 5-288671 |
| Nov. 19, 1993 | [JP] | Japan | 5-314281 |
| Dec. 2, 1993 | [JP] | Japan | 5-338885 |
| Dec. 16, 1993 | [JP] | Japan | 5-343721 |

[51] Int. Cl.[6] ............ C09B 62/507
[52] U.S. Cl. ............ 534/642; 8/549; 8/682
[58] Field of Search ............ 534/641, 642; 8/557, 560, 588, 549, 682

[56] References Cited

U.S. PATENT DOCUMENTS

| 4,036,825 | 7/1977 | Fuchs et al. | 534/642 |
| 4,063,880 | 12/1977 | Tullis | 8/526 |
| 4,453,943 | 6/1984 | Balliello | 8/524 |
| 5,030,244 | 7/1991 | Neumann et al. | 8/526 |
| 5,242,467 | 9/1993 | Yamada et al. | 8/549 |
| 5,391,718 | 2/1995 | Tzikas et al. | 534/637 |
| 5,508,389 | 4/1996 | Mischke et al. | 534/581 |

FOREIGN PATENT DOCUMENTS 5126612 12/1991 Germany.

OTHER PUBLICATIONS

Colour Index, 3 rd., vol. 4, *"The Society of Dyers and Colourists"*.

*Primary Examiner*—Margaret Einsmann
*Attorney, Agent, or Firm*—Oblon, Spivak, McClelland, Maier & Neustadt, P.C.

[57] ABSTRACT

A red reactive dye having the following formula (I) in its free acid form:

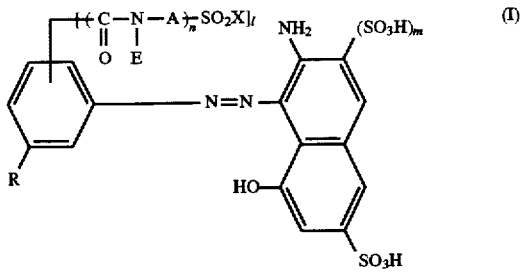

wherein X is $-CH=CH_2$ or $-C_2H_4W$ (wherein W is a group splittable by alkali), A is a $C_{2-3}$ alkylene group or a $C_{2-3}$ alkylenoxy $C_{2-3}$ alkylene group, E is a hydrogen atom, a $C_{1-3}$ alkyl group or $-A-SO_2X$ (wherein A and X are as defined above), n is 0 or 1, l is 1 or 2, m is 0 or 1, and R is a hydrogen atom, $-OH$, $-CN$, $-CH_3$, $-CF_3$, $-SO_3H$, $-COOH$, $-CH_2SO_3H$ or $-CH_2SO_2X$ (wherein X is as defined above), provided that a compound of the formula (I) wherein R is a hydrogen atom, each of m and n is 0, l is 1, and $-SO_2X$ is $-SO_2CH=CH_2$ which is bonded at the ortho position to the azo group, is excluded.

7 Claims, No Drawings

RED REACTIVE DYES, THEIR COMPOSITIONS AND DYEING METHOD EMPLOYING THEM

This is a Division, of application Ser. No. 08/400,934 filed on Mar. 9, 1995 now U.S. Pat. No. 5,545,234, which is a Divisional Application of Ser. No. 08/279,006 filed Jul. 22, 1994 (Abandoned)

The present invention relates to water-soluble monoazo reactive dyes suitable for dyeing or printing materials containing hydroxyl groups or amide groups, such as cellulose fibers, natural or synthetic polyamide fibers, polyurethane fibers or leathers, or fiber blends thereof. More particularly, it relates to reactive dyes capable of dyeing especially cellulose fibers in red colors excellent in light fastness and levelness, their compositions and a dyeing method employing them.

Reactive dyes are widely used for dyeing various materials, particularly cellulose fibers, as their colors are clear, and they are excellent in various fastness properties. On the other hand, in the industrial field of dyeing, there is an increasing demand for better dyes.

In recent years, a demand for reactive dyes of red color type which are excellent in light fastness is increasing more than ever. Conventional reactive dyes are usually at a level of grade 4, and no dyes as excellent as grade 5 have been known, (after irradiation with carbon ark lamp light for 80 hours).

In order to meet the above-mentioned demand, the present inventors have conducted extensive researches to develop a red reactive dye which is excellent in light fastness, color fastness to light and perspiration and color fastness to chlorine, particularly in light fastness. As a result, the present invention has been accomplished.

The present invention provides a red reactive dye having the following formula (I) in its free acid form, a composition thereof and a dyeing method employing it:

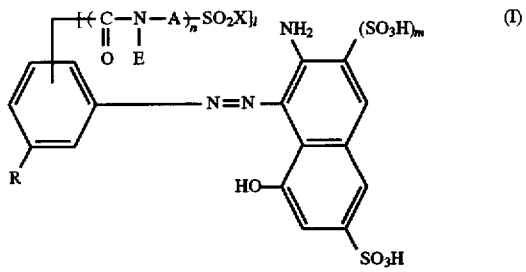

wherein X is —CH=CH$_2$ or —C$_2$H$_4$W (wherein W is a group splittable by alkali), A is a C$_{2-3}$ alkylene group or a C$_{2-3}$ alkylenoxy C$_{2-3}$ alkylene group, E is a hydrogen atom, a C$_{1-3}$ alkyl group or —A—SO$_2$X (wherein A and X are as defined above), n is 0 or 1, l is 1 or 2, m is 0 or 1, and R is a hydrogen atom, —OH, —CN, —CH$_3$, —CF$_3$, —SO$_3$H, —COOH, —CH$_2$SO$_3$H or —CH$_2$SO$_2$X (wherein X is as defined above), provided that a compound of the formula (I) wherein R is a hydrogen atom, each of m and n is 0, l is 1, and —SO$_2$X is —SO$_2$CH=CH$_2$ which is bonded at the ortho position to the azo group, is excluded.

Now, the present invention will be described in detail with reference to the preferred embodiments.

In the above formula (I), X is —CH=CH$_2$ or —C$_2$H$_4$W, wherein W is a group splittable by alkali. Under the action of alkali, —C$_2$H$_4$W undergoes splitting so that it will be converted to —CH=CH$_2$ while splitting W—H off.

As the group W to be split off under the action of alkali, —OSO$_3$H, —SSO$_3$H, —OPO$_3$H$_2$, —OCOCH$_3$ or a halogen atom may usually be mentioned, particularly preferred is —OSO$_3$H. The C$_{2-3}$ alkylene group or the C$_{2-3}$ alkylenoxy C$_{2-3}$ alkylene group for —A— may, for example, be an ethylene group, a propylene group, an ethylenoxyethylene group, or a propylenoxypropylene group.

Specific examples of —A—SO$_2$X include a β-(β-chloroethylsulfonyl)ethyl group, a γ-(β-chloroethylsulfonyl)propyl group, a γ-(β-sulfatoethylsulfonyl)propyl group, a β-(vinylsulfonyl)ethyl group, a β-[β-(β-chloroethylsulfonyl)ethoxy]ethyl group, a γ-[γ-(β-sulfatoethylsulfonyl)propoxy]propyl group, and a β-[β-(vinylsulfonyl)ethoxy]ethyl group. Particularly preferred are, for example, —C$_2$H$_4$SO$_2$C$_2$H$_4$OSO$_3$H, —C$_3$H$_6$SO$_2$C$_2$H$_4$OSO$_3$H, and —C$_2$H$_4$OC$_2$H$_4$SO$_2$C$_2$H$_4$OSO$_3$H.

The C$_{1-3}$ alkyl group for E may, for example, be a methyl group, an ethyl group or a propyl group. Particularly preferred is a methyl group or an ethyl group. As R, a sulfonic acid group or a carboxyl group is preferred.

Among the reactive dyes of the formula (I), preferred from the viewpoint of the light fastness and the color fastness to light and perspiration, is a reactive dye wherein n is 0 or 1, l is 1, X is —C$_2$H$_4$OSO$_3$H, R is a sulfonic acid group or a carboxyl group, and m is 0. Further, a reactive dye of the formula (I) wherein

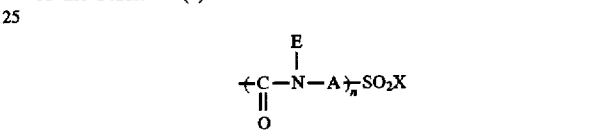

or R is located at the ortho position to the azo group, is excellent also in the color fastness to chlorine.

The reactive dyes of the present invention can be prepared, for example, as follows.

Namely, a compound of the formula (A):

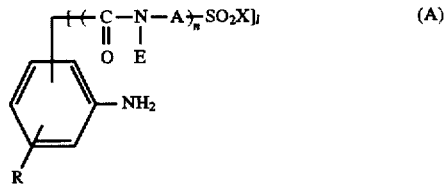

wherein X, A, E, R, n and l are as defined above, is diazotized in accordance with a conventional method, followed by coupling with a compound of the following structural formula (B):

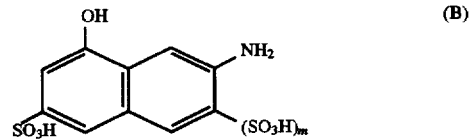

wherein m is as defined above, in an aqueous medium at a temperature of from 0° to 5° C. at a pH of 2 to 3, then, sodium chloride is added to the reaction solution, and formed precipitates are collected by filtration.

With such reactive dyes, it is possible to improve the leveling property and the build up property by combining two or more of them into a composition. Such a dye composition may, for example, be a composition comprising a dye of the formula (I) wherein X is —CH=CH$_2$ and a dye of the formula (I) wherein X is —C$_2$H$_4$W, i.e. a composition comprising a dye of the following formula (I-A) and a dye of the following formula (I-B):

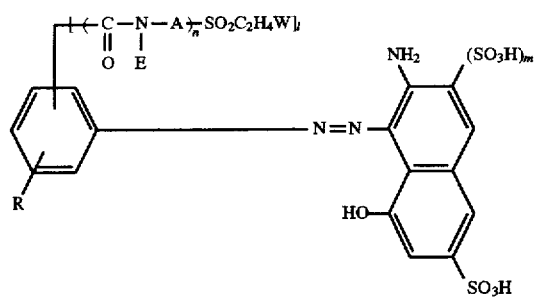 (I-A)

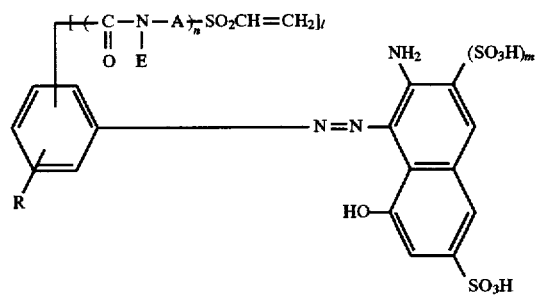 (I-B)

or a composition comprising a dye of the formula (I) wherein

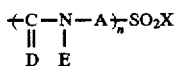

is bonded at the ortho position to azo group and a dye of the formula (I) wherein the same group is bonded at the para position, i.e. a composition comprising a dye of the following formula (I-C) and a dye of the following formula (I-D):

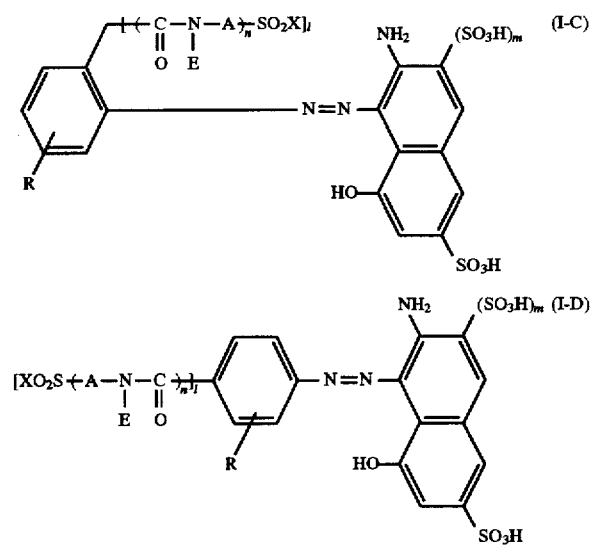

or a composition comprising a dye of the formula (I) wherein m is 0 and a dye of the formula (I) wherein m is 1, i.e. a composition comprising a dye of the following formula (I-E) and a dye of the following formula (I-F):

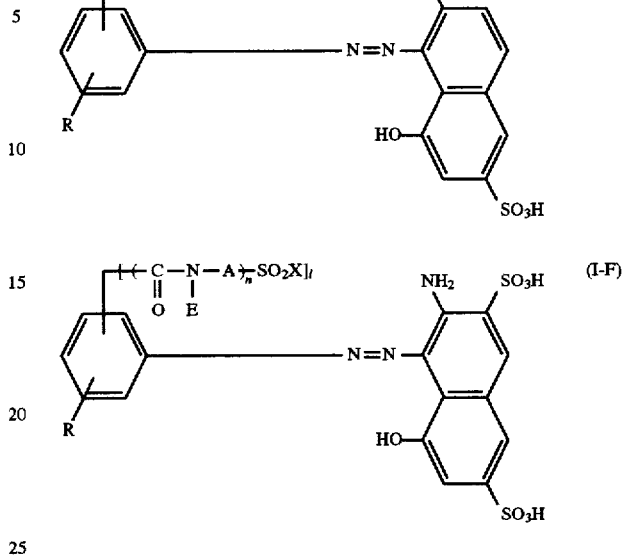

In the above formulas (I-A) to (I-F), X, A, E, R, n, m and l are as defined above.

Preferred examples of the dyes constituting such compositions include dyes of the following formulas (II) to (V):

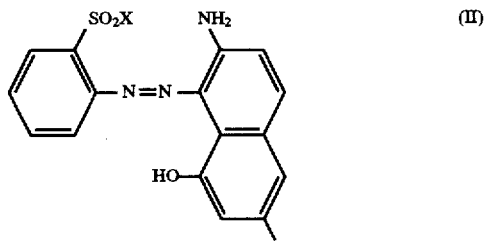 (II)

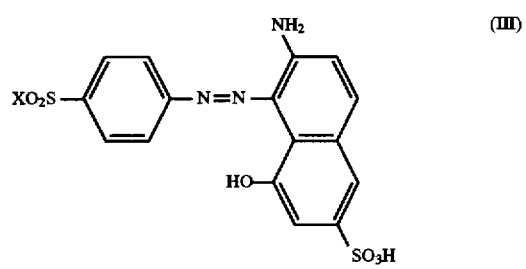 (III)

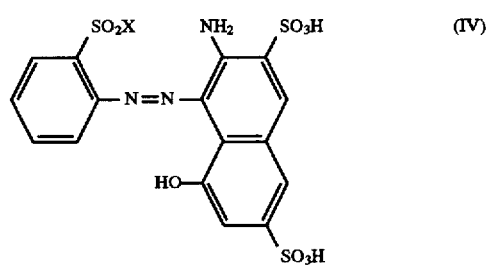 (IV)

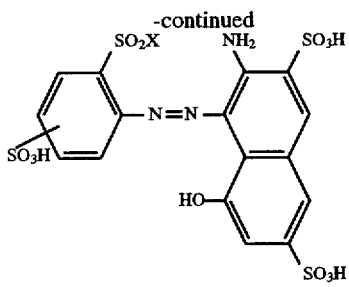
(V)

In the above formulas (II) to (V), X is as defined above.

When the dyes of the above formulas (II) to (V) are combined to form a composition, a known dye of the following formula (VI) (see Japanese Examined Patent Publication No. 1643/1956) may be incorporated:

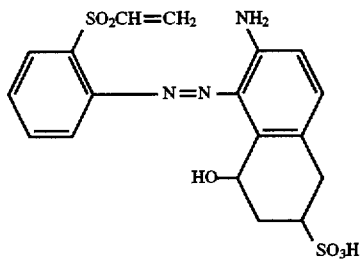
(VI)

In the present invention, the dyes of the formulas (II) to (V) may optionally be combined to obtain a dye composition. The proportions of the respective dyes differ depending upon the dyes constituting the composition. For example, in the case of a composition comprising the dyes of the formulas (II) and (III), the weight ratio of (II):(III) is usually from 100:30 to 100:300, preferably from 100:70 to 100:130; in the case of a composition comprising the dyes of the formulas (II) and (IV), the weight ratio of (II):(IV) is usually from 100:10 to 100:200, preferably from 100:20 to 100:150, more preferably from 100:30 to 100:100; and in the case of a composition comprising a dye (VS) wherein X is —CH=CH$_2$ and a dye (ES) wherein X is —C$_2$H$_4$W, the weight ratio of (VS):(ES) is usually from 100:1 to 100:50, preferably from 100:3 to 100:40, more preferably from 100:5 to 100:30.

The dyes of the formulas (I) to (VI) of the present invention may, respectively, be present in the form of their free acids or in the form of their salts. In the form of their salts, alkali metal salts and alkaline earth metal salts, particularly sodium salts, potassium salts and lithium salts, are preferred. To obtain a liquid composition having a high concentration, lithium salts are particularly preferred.

To prepare a reactive dye composition in the present invention, the dyes of the formulas (II) to (IV) may be mixed by simultaneously synthesizing them. Otherwise, they may separately be synthesized and then mixed. Or, they may be mixed at the time of dyeing.

It is possible to improve the solubility and the solution stability in water or in aqueous alkali by incorporating a condensation product of naphthalene sulfonic acid or an alkylnaphthalene sulfonic acid with formaldehyde and a pH buffering agent showing a buffering effect within a range of pH4 to 7, to the above composition.

In the present invention, the alkylnaphthalene sulfonic acid may, for example, be a lower alkyl naphthalene sulfonic acid such as methylnaphthalene sulfonic acid, ethylnaphthalene sulfonic acid, propylnaphthalene sulfonic acid or butylnaphthalene sulfonic acid. Such an alkylnaphthalene sulfonic acid may be not only a monoalkyl compound but also a polyalkyl compound such as a dialkyl compound or a mixture thereof. The alkyl may be of a single type or a mixture of two or more types, and may be a mixture with naphthalene sulfonic acid.

The buffering agent showing a buffering effect within a range of pH4 to 7 includes acids such as sodium dihydrogen phosphate, sodium monohydrogen phosphate, potassium dihydrogen phosphate, potassium monohydrogen phosphate, sodium hydrogen phthalate, potassium hydrogen phthalate, acetic acid, tartaric acid and citric acid, and their sodium salts, potassium salts and ammonium salts. They may be used alone or in combination as a mixture.

When the condensation product of naphthalene sulfonic acid or an alkylnaphthalene sulfonic acid with formaldehyde and the pH buffering agent are mixed to the above dye composition, the weight ratios are such that the dye composition is from 20 to 85 parts by weight, the condensation product is from 3 to 50 parts by weight, and the pH buffering agent is from 1 to 25 parts by weight.

The dye composition of the present invention may contain a hydrotrope agent such as urea or ε-caprolactam. Further, inclusion of sodium chloride or sodium sulfate, or incorporation of an antidusting agent such as a mineral oil emulsion, is acceptable within a range not to adversely affect the solubility of the dye composition.

The amount of such additives may optionally be selected preferably within a range of up to 70 parts by weight, per 100 parts by weight of the total amount of the above dye composition, the condensation product of naphthalene sulfonic acid or an alkylnaphthalene sulfonic acid with formaldehyde and the pH buffering agent.

In a preferred embodiment, the present invention provides a red reactive dye composition comprising 100 parts by weight of a dye having the formula (T) in its free acid form:

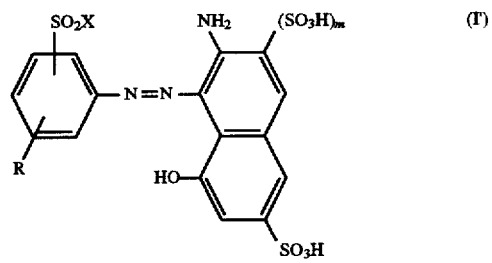
(T)

wherein X is —CH=CH$_2$ or —C$_2$H$_4$W (wherein W is a group splittable by alkali), R$^1$ is a hydrogen atom, —SO$_2$X, —CH$_2$SO$_2$X (wherein X is —CH=CH$_2$ or —C$_2$H$_4$W (wherein W is a group splittable by alkali)), a halogen atom, a lower alkyl group, a lower alkoxy group, —SO$_2$X or —CH$_2$SO$_2$X and m is 0 or 1, and from 10 to 300 parts by weight of a dye having the formula (X) in its free acid form:

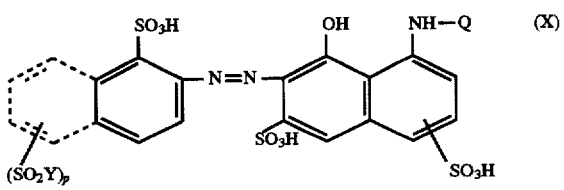
(X)

wherein Q is

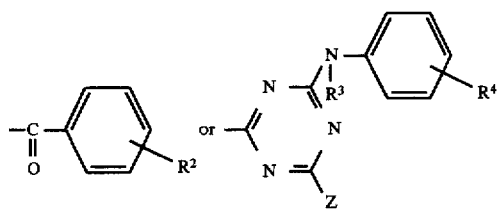

wherein $R^2$ is a hydrogen atom or a halogen atom, $R^3$ is a hydrogen atom or a lower alkyl group, $R^4$ is a hydrogen atom, a halogen atom, a lower alkyl group or —$SO_2X$ wherein X is —$CH=CH_2$ or —$C_2H_4W$ (W is a group splittable by alkali), and Z is a halogen atom, a hydroxyl group,

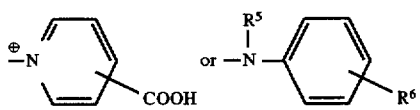

(wherein $R^5$ is a hydrogen atom or a lower alkyl group, and $R^6$ is a hydrogen atom, a halogen atom, a carboxyl group, a sulfonic acid group or —$SO_2X$ (wherein X is as defined above)), Y is a hydroxyl group, —$CH=CH_2$ or —$CH_2CH_2W$ (wherein W is as defined above), and p is 0 or 1.

In the above formulas (I') and (X), W is preferably —$OSO_3H$.

As the lower alkyl group for each of $R^1$, $R^3$, $R^4$ and $R^5$, a $C_{1-4}$ alkyl group such as a methyl group, an ethyl group, a n-propyl group or a n-butyl group, may, usually, be mentioned. The halogen atom for each of Z, $R^1$, $R^2$, $R^4$ and $R^6$ is usually a chlorine atom, a fluorine atom or a bromine atom. Particularly, Z is preferably a chlorine atom or a fluorine atom, and each of $R^1$, $R^2$, $R^4$ and $R^6$ is preferably a chlorine atom or a bromine atom. In the above formula (I'), it is particularly preferred that $R^1$ is a hydrogen atom, and $SO_2X$ is located at the ortho position to the azo group of the benzene ring.

For the selection of the respective groups in the above-mentioned formula (X), it is needless to say necessary to make the selection so that at least one reactive group is present for the reactive dye.

These dyes may be present in the form of free acids or salts thereof. As the salts, alkali metal salts or alkaline earth metal salts such as lithium salts, sodium salts, potassium salts or calcium salts, are usually preferred.

The water-soluble reactive dyes of the above formulas (I') and (X') can be prepared by conventional methods, and the methods for their production are not particularly limited.

In the present invention, the dye of the formula (X) is incorporated usually in an amount of from 10 to 300 parts by weight, preferably from 30 to 120 parts by weight, per 100 parts by weight of the dye of the formula (I'). If the amount of the dye of the formula (X) is too small or too large, it will be difficult to obtain a dye having a good balance of the color fastness to light and perspiration, the color fastness to chlorine and the dyeing property, as intended by the present invention. These dyes may be preliminarily be mixed, or they may be mixed at the time of dyeing.

The fibers to be dyed by the dyes and the dye compositions of the present invention may, for example, cellulose fibers such as cotton, viscose rayon, cupra ammonium rayon and hemp, and nitrogen-containing fibers such as polyamide fibers, wool and silk. However, cellulose fibers are particularly excellently dyeable. These fibers may be in the form of a fiber blend with e.g. polyester fibers, cellulose triacetate fibers or polyacrylonitrile fibers.

When cellulose fibers are subjected to exhaustion dyeing with the dyes or the dye compositions of the present invention, an acid-binding agent composed of an inorganic alkali such as sodium bicarbonate or sodium carbonate, or an organic base such as triethylamine, may be used, and dyeing is conducted by an addition of a neutral salt such as Glauber's salt or sodium chloride. Specifically, dyeing may be carried out usually at a temperature of from 50° to 60° C. using from 20 to 50 g/l of Glauber's salt.

When cellulose fibers are to be dyed by a padding method, padding is conducted at room temperature or at an elevated temperature, and after drying, the fibers are subjected to steaming or dry heating for fixing.

When printing is to be applied to cellulose fibers, in a single phase, a printing paste containing e.g. sodium bicarbonate or other acid-binding agent is printed, followed by steaming at a temperature of from 100° to 160° C., or in two phases, e.g. a neutral or weakly acidic printing paste is printed, and the fibers are then introduced and passed through a high temperature electrolyte-containing alkaline bath, or subjected to overpadding with an alkaline electrolyte-containing padding solution, followed by steaming or dry heating treatment.

To the printing paste, a thickening agent such as sodium arginate or starch ether, or an emulsifier, may be incorporated, if necessary, in combination with a usual printing auxiliary such as urea, or a dispersant.

Dyeing of synthetic or natural polyamide or polyurethane fibers is carried out by firstly conducting exhaustion from an acidic to weakly acidic dye bath under control of the pH value and then changing the pH value to neutral or, in some cases, to alkaline for fixing. The dyeing is carried out usually at a temperature of from 60° to 120° C.

When cellulose fiber materials are dyed with the dyes or the dye compositions of the present invention, particularly excellent light fastness, color fastness to light and perspiration and color fastness to chlorine will be obtained.

When the above-described red reactive dyes and dye compositions are used for dyeing, it is possible to obtain dyed products having particularly excellent light fastness and color fastness to light and perspiration by using a certain yellow dye and/or a blue dye in combination. As such a yellow dye, one or more of the dyes of the following formulas (i) to (iv) may be employed.

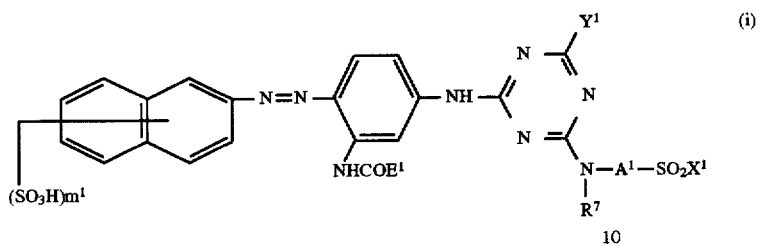
(i)

wherein $m^1$ is an integer of 2 or 3, $R^7$ is a hydrogen atom or a lower alkyl group, $E^1$ is an amino group or —COCH$_3$, $A^1$ is a phenylene or naphthylene group which may be substituted, an alkylene group or an alkylenoxy alkylene group, $Y^1$ is a halogen atom, —NHC$_2$H$_4$SO$_3$H or

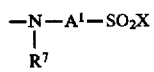

(wherein $A^1$ and $R^7$ are as defined above, X is —CH=CH$_2$ or —C$_2$H$_4$W (wherein W is a group splittable by alkali), and $X^1$ is the above-mentioned X or a hydroxyl group),

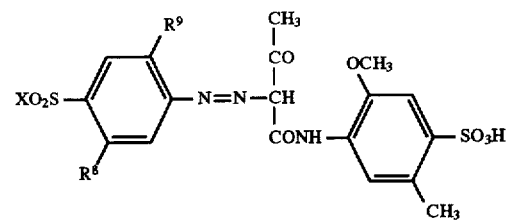
(ii)

wherein $R^8$ is a lower alkyl group or a lower alkoxy group, $R^9$ is a lower alkoxy group, and X is as defined above,

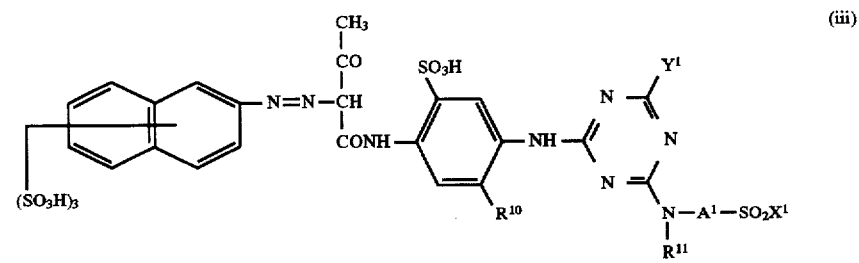
(iii)

wherein $R^{10}$ is a lower alkyl group, $R^{11}$ is a hydrogen atom or a lower alkyl group, and $A^1$, $X^1$ and $Y^1$ are as defined above,

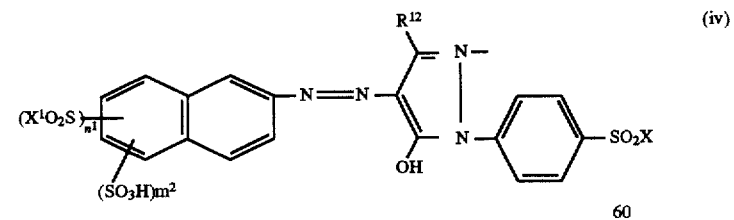
(iv)

wherein $n^1$ is 0 or 1, $m^2$ is 1 or 2, $R^{12}$ is a methyl group or a carboxyl group, and X and $X^1$ are as defined above.

As the blue dye, one or more of the dyes of the following formulas (v) to (vii) may be used.

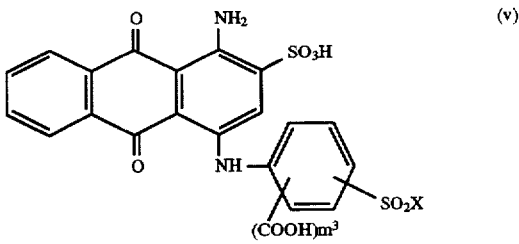
(v)

wherein $m^3$ is 0 or 1, and X is as defined above.

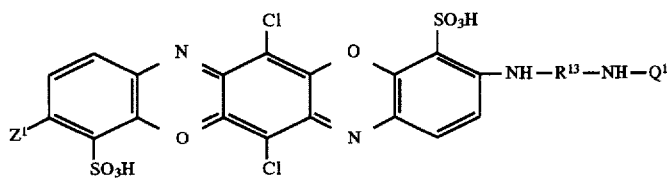

(vi)

wherein $Z^1$ is an amino group or —NH—$R^{14}$—NHQ², each of $R^{13}$ and $R^{14}$ is a lower alkylene group, each of $Q^1$ and $Q^2$ is

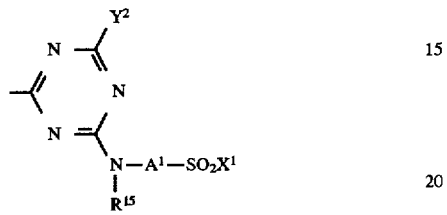

(wherein $Y^2$ is a halogen atom,

or an anilino group substituted by an sulfonic acid group, $R^{15}$ is a hydrogen atom or a lower alkyl group, and $A^1$ and $X^1$ are described as above) or

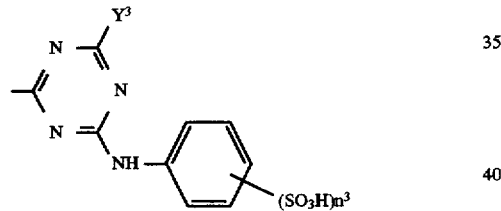

wherein $Y^3$ is a halogen atom or

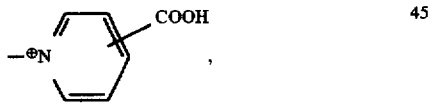

and $n^3$ is an integer of from 1 to 3), be mentioned. Specific examples include the following groups (wherein symbol * indicates the bond connected to the nitrogen atom bonded to the triazine ring):

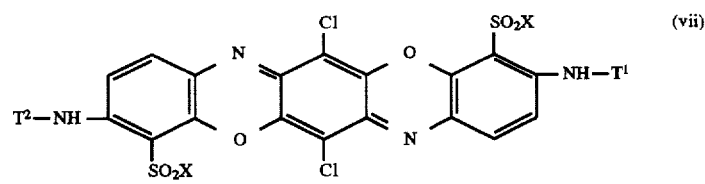

(vii)

wherein each of $T^1$ and $T^2$ is a lower alkyl group which may be substituted, and X is as defined above.

$A^1$ for each of the above formulas (i), (iii) and (vi) represents a phenylene or naphthylene group which may be substituted, and as the substituent, a halogen atom such as a bromine atom or a chlorine atom, a nitro group, a sulfonic acid group, a carboxyl group, a $C_{1-4}$ alkyl group, a $C_{1-4}$ alkoxy group or —CH$_2$SO$_2$C$_2$H$_4$OSO$_3$H may, for example,

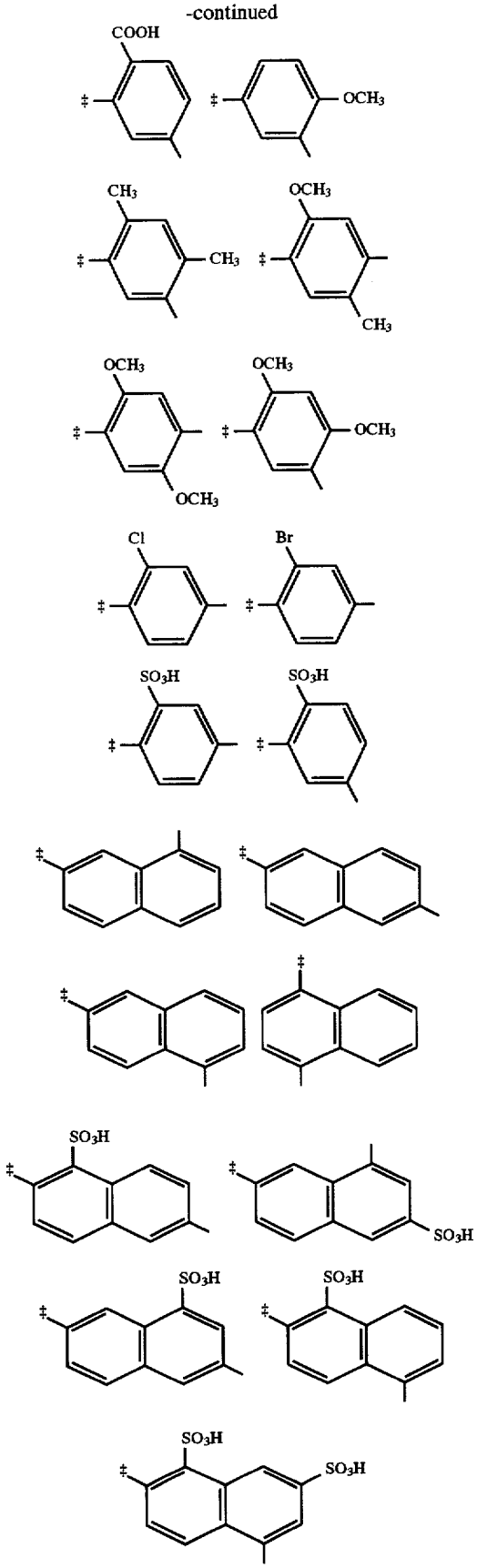
-continued

Further, as the alkylene group and the alkylenoxyalkylene group for $A^1$, a $C_{1-4}$ alkylene group and a $C_{1-4}$ alkylenoxyalkylene group may, for example, be mentioned.

Specific examples for $-A^1-SO_2X^1$ include a β-(β-chloroethylsulfonyl)ethyl group, a γ-(β-chloroethylsulfonyl)propyl group, a δ-(β-chloroethylsulfonyl)butyl group, a γ-(β-sulfatoethylsulfonyl)propyl group, a β-(vinylsulfonyl)ethyl group, a β-[β-(β-chloroethylsulfonyl)ethoxy]ethyl group, a γ-[γ-(β-sulfatoethylsulfonyl)propoxy]propyl group and a β-[β-(vinylsulfonyl)ethoxy]ethyl group. Particularly preferred may, for example, be $-C_2H_4SO_2C_2H_4OSO_3H$, $-C_3H_6SO_2C_2H_4OSO_3H$ and $-C_2H_4OC_2H_4SO_2C_2H_4OSO_3H$.

As the lower alkyl group for each of $R^7$, $R^8$, $R^{10}$, $R^{11}$ and $R^{15}$, a methyl group, an ethyl group, a linear or branched propyl group, or a linear or branched butyl group may, for example, be mentioned. Particularly preferred is a methyl group or an ethyl group.

As the lower alkoxy group for each of $R^8$ and $R^9$, a methoxy group, an ethoxy group, a linear or branched propoxy group or a linear or branched butoxy group may, for example, be mentioned. Particularly preferred is a methoxy group.

As the halogen atom for each of $Y^1$, $Y^2$ and $Y^3$, a fluorine atom, a chlorine atom or a bromine atom may be mentioned. Particularly preferred is a fluorine atom or a chlorine atom.

These reactive dyes may, respectively, be present in the form of free acids or salts thereof. As the salts, alkali metal salts or alkaline earth metal salts, such as lithium salts, sodium salts, potassium salts or calcium salts are usually preferred.

One or more members selected from the group consisting of yellow dyes of the formulas (i) to (iv) and/or one or more members selected from the group consisting of blue dyes of the formulas (v) to (vii) are used in an amount within a range of from 0.01 to 100 times by weight, preferably from 0.1 to 50 times by weight, relative to the red dye.

Further, for the purpose of color adjustment, another dye as a third component may be incorporated within a range not to impair the effects of the present invention, e.g. in an amount of not higher than 10 wt %.

Now, the present invention will be described in further detail with reference to Examples. However, it should be understood that the present invention is by no means restricted to the following Examples.

EXAMPLE 1

0.2 g of a dye having the following structural formula (II-1) in its free acid form was dissolved in 200 ml of water:

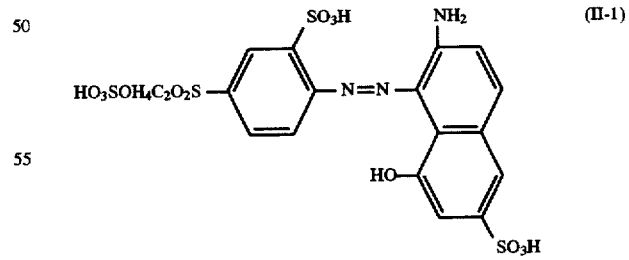

(II-1)

10 g of Glauber's salt was added thereto. Then, 10 g of unmercerized cotton cloth was immersed therein, and the temperature was raised to 50° C. over a period of 30 minutes. Then, 4 g of sodium carbonate was added thereto, followed by dyeing at 50° C. for one hour. Thereafter, washing with water, soaping, washing with water and drying were carried out to obtain a rubine dyed product having excellent levelness.

The light fastness was grade 5 (irradiation for 40 hours), the color fastness to light and perspiration was grade 4⁺, and the color fastness to chlorine was grade 4⁻.

The light fastness was evaluated in accordance with JIS L-0842, the color fastness to light and perspiration was evaluated in accordance with JIS L-0888 (Method A using alkaline artificial perspiration), and the color fastness to chlorine was evaluated in accordance with JIS L-0884 (test solution: effective chlorine 10 mg/l, temperature: 25°±2° C.).

EXAMPLE 2

100 g of a dye having the following structural formula (II-1) in its free acid form:

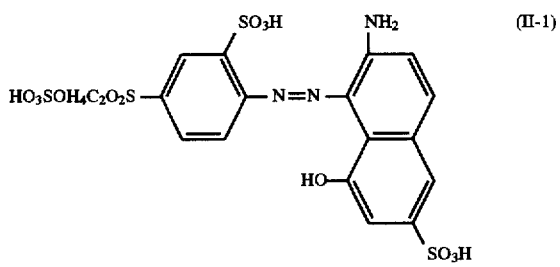

and 30 g of a dye having the following structural formula (III-1) in its free acid form:

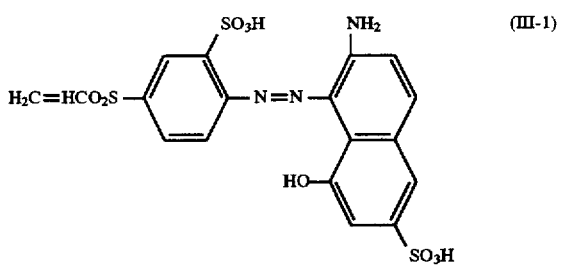

were blended to obtain a dye composition.

0.1 g, 0.2 g and 0.4 g of this composition were, respectively, dissolved in 200 ml of water, and 10 g of Glauber's salt was added to each solution. Unmercerized cotton cloth was immersed in each solution, and the temperature was raised to 60° C. over a period of 30 minutes. Then, 4 g of sodium carbonate was added thereto, followed by dyeing at 60° C. for about one hour. Thereafter, washing with water, soaping, washing with water and drying were carried out to obtain a rubine dyed product having an excellent buildup property and excellent levelness.

The light fastness of the cloth dyed with 0.2 g of the composition was grade 5 (irradiation for 40 hours), the color fastness to light and perspiration thereof was grade 4⁺, and the color fastness to chlorine thereof was grade 4⁻.

Reference Example 1

In Example 2, dyeing was carried out in the same manner as in Example 1 by using 0.1 g, 0.2 g and 0.4 g of the reactive dye of the formula (III-1). As a result, the obtained dyed products were poor in the buildup properties as compared with the dyed products obtained in Example 2.

EXAMPLE 3

25 g and 50 g of the dye composition of Example 2 were, respectively, dissolved in hot water, and the solutions were cooled to 25° C. To each solution, 5.5 g of a 22.5% sodium hydroxide aqueous solution and 150 g of water glass with 50° Baumé were added, and water was further added to bring the total amount to 1,000 g at 25° C. Immediately thereafter, each solution was used as a padding solution and impregnated to a cotton woven fabric. The cotton woven fabric was wound up, then sealed in a polyethylene film and stored for 20 hours in a room at 20° C.

Thereafter, each dyed product was washed with cool water and hot water and then subjected to soaping in a boiling soaping bath. It was again washed with cool water and finally dried to obtain a rubine dyed product having an excellent buildup property.

EXAMPLES 4-1 TO 4-20

The reactive dye used in Example 1 was changed to the dye as identified in Table 1, and dyeing was carried out in accordance with Example 1. As a result, dyed products having the colors as identified in Table 1, which had light fastness of grade 5 (irradiation for 40 hours), color fastness to light and perspiration of grade 4 and color fastness to chlorine of grade 4⁻, were obtained.

TABLE 1
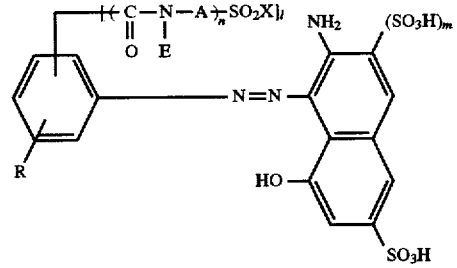
| No. | R | m | Color of the dyed cloth |
|---|---|---|---|
| 4-1 | 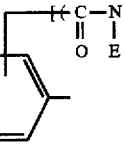 | 0 | Rubine |
| 4-2 |  | 0 | Red |
| 4-3 | 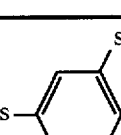 | 0 | Red |
| 4-4 | 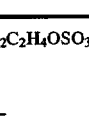 | 0 | Rubine |
| 4-5 | 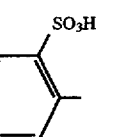 | 0 | Bluish red |
| 4-6 |  | 0 | Rubine |
| 4-7 | 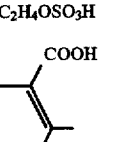 | 0 | Rubine |

TABLE 1-continued

[Structure 1: benzene ring with R substituent and [(C(=O)-N(E)-A)ₙ-SO₂X]ₗ group, azo-linked (N=N) to naphthalene bearing NH₂, (SO₃H)ₘ, HO, and SO₃H groups]

[Structure 2: benzene ring with R substituent and [(C(=O)-N(E)-A)ₙ-SO₂X]ₗ group]

| No. | R | m | Color of the dyed cloth |
|---|---|---|---|
| 4-8 | benzene with CONHC₂H₄OC₂H₄SO₂C₂H₄OSO₃H and SO₃H | 0 | Red |
| 4-9 | benzene with CON(C₂H₄SO₂C₂H₄Cl)₂ and SO₃H | 0 | Red |
| 4-10 | benzene with two HO₃SOH₄C₂O₂SH₄C₂NHCO- groups | 1 | Rubine |
| 4-11 | benzene with HO₃SOH₄C₂O₂SH₂C- and HO₃SOH₄C₂O₂S- groups | 1 | Rubine |
| 4-12 | benzene with SO₂C₂H₄OSO₃H and HO₃SOH₄C₂O₂S- groups | 1 | Rubine |
| 4-13 | benzene with CON(CH₃)C₃H₆OC₃H₆SO₂C₂H₄OSO₃H | 0 | Red |

TABLE 1-continued
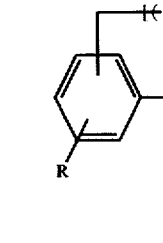
| No. | R | m | Color of the dyed cloth |
|---|---|---|---|
| 4-14 | 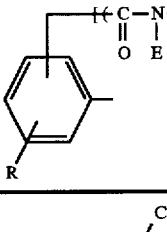 | 0 | Red |
| 4-15 | 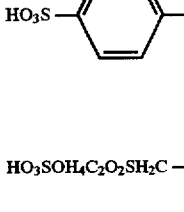 | 0 | Rubine |
| 4-16 | 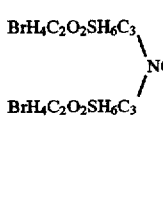 | 0 | Rubine |
| 4-17 |  | 0 | Rubine |
| 4-18 | 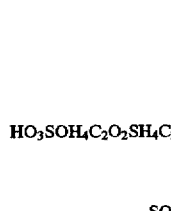 | 1 | Rubine |
| 4-19 | 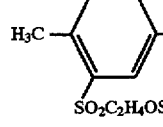 | 1 | Rubine |
| 4-20 | 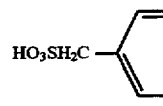 | 0 | Rubine |

EXAMPLE 5

0.2 g of a dye having the following structural formula (IV-1) in its free acid form was dissolved in 200 ml of water:

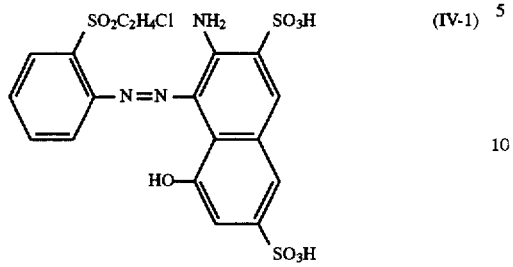

Then, 10 g of Glauber's salt was added thereto. Then, 10 g of unmercerized cotton cloth was immersed therein. The temperature was raised to 50° C. over a period of 30 minutes, followed by dyeing for one hour. Washing with water, soaping, washing with water and drying were carried out to obtain a bluish red dyed product having excellent levelness.

The light fastness was grade 5 (irradiation for 80 hours with carbon ark lamp light), the color fastness to light and perspiration was grade $4^+$, and the color fastness to chlorine was grade $4^-$. The evaluations were conducted-by the same methods as described in Example 1.

EXAMPLES 6-1 TO 6-3

A dye having the following structural formula (IV-2) in its free acid form:

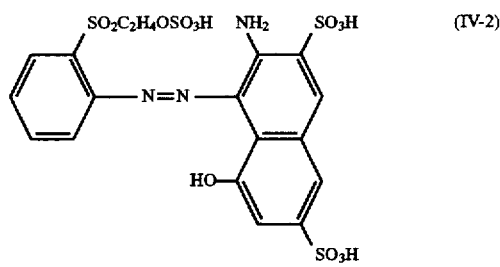

and a dye having the following structural formula (IV-3) in its free acid form:

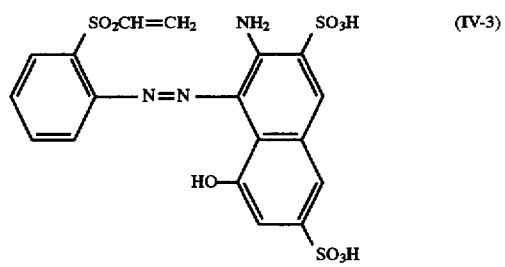

were blended in amounts as identified in Table 2 to obtain dye compositions. 0.1 g, 0.2 g and 0.4 g of each of these compositions were, respectively, dissolved in 200 ml of water, and 10 g of Glauber's salt was added to each solution. Then, 10 g of unmercerized cotton cloth was immersed in each solution, and the temperature was raised to 60° C. over a period of 30 minutes. Then, 4 g of sodium carbonate was added to each solution, followed by dyeing at 60° C. for one hour. Washing with water, soaping, washing with water and drying were carried out to obtain bluish red dyed products having excellent buildup properties and excellent levelness. The light fastness of the cloth dyed with 0.2 g of each composition was grade 5 (irradiation for 80 hours with carbon ark lamp light), the color fastness to light and perspiration thereof was grade $4^+$, and the color fastness to chlorine thereof was grade 4.

The evaluations were carried out by the same methods as described in Example 1.

TABLE 2

| No. | Dye (IV-2) (g) | Dye (IV-3) (g) |
| --- | --- | --- |
| 6-1 | 100 | 10 |
| 6-2 | 100 | 5 |
| 6-3 | 100 | 25 |

Reference Example 2

Dyeing was conducted in the same manner as in Example 6 by using 0.1 g, 0.2 g and 0.4 g of the dye of the formula (IV-2) used in Example 6. As a result, the dyed products were inferior in the buildup properties as compared with the products dyed with the compositions of Example 6.

EXAMPLE 7

25 g and 50 g of the dye composition of Example 6-1 were, respectively, dissolved in hot water, and the solutions were cooled to 25° C. To each solution, 5.5 g of a 32.5% sodium hydroxide aqueous solution and 150 g of water glass with 50° Baumé were added, and water was further added to bring the total amount to 1,000 g at 25° C. Immediately thereafter, each solution was used as a padding solution and impregnated to a cotton woven fabric. Then, the fabric was wound up, then sealed in a polyethylene film and stored for 20 hours in a room at 20° C. Thereafter, the dyed product was washed with cool water and hot water and then subjected to soaping in a boiling soaping bath. The dyed product was further washed with cool water and finally dried to obtain a bluish red dyed product having an excellent buildup property.

EXAMPLES 8-1 TO 8-3

A dye having the following structural formula (II-1) in its free acid form:

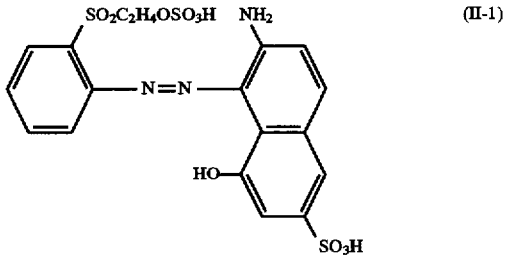

and a dye having the following structural formula (VI):

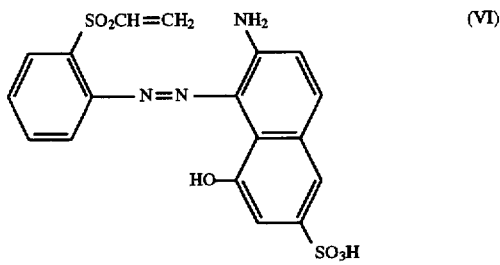

were blended in amounts as identified in Table 3 to obtain dye compositions.

0.1 g, 0.2 g and 0.4 g of each of these compositions were, respectively, dissolved in 200 ml of water. Then, 10 g of Glauber's salt was added to each solution to prepare a dye solution. 10 g of unmercerized cotton cloth was immersed in each solution, and the temperature was raised to 60° C. over a period of 30 minutes. Then, 4 g of sodium carbonate was added thereto, followed by dyeing at 60° C. for one hour. Then, washing with water, soaping, washing with water and drying were carried out to obtain a red dyed product having an excellent buildup property.

The light fastness of the cloth dyed with 0.2 g of each composition was grade 5, and the color fastness to light and perspiration thereof was grade 4 to 5. It is noteworthy that a reactive dye containing no metal having such excellent color fastness to light and perspiration has never been seen so far as a red dye is concerned.

TABLE 3

| No. | Dye (II-1) (g) | Dye (VI) (g) |
| --- | --- | --- |
| 6-1 | 100 | 10 |
| 6-2 | 100 | 5 |
| 6-3 | 100 | 25 |

Comparative Example 1

Dyeing was conducted in the same manner as in Example 8 by using 0.1 g, 0.2 g and 0.4 g of the reactive dye of the structural formula (VI) used in Example 8, whereby the dyed product was substantially inferior in the buildup property and poor also in the levelness.

EXAMPLE 9

To 70 parts by weight of a dye composition comprising 85 wt % of a dye of the above structural formula (II-1) and 15 wt % of a dye of the above structural formula (VI), 10 parts by weight of a condensation product of methylnaphthalene sulfonic acid with formaldehyde having a sulfonation degree of 120% and an average condensation degree of 1.8, 5 parts by weight of sodium phosphate (crystals), 14 parts by weight of sodium sulfate (anhydrous) and 1 part by weight of a mineral oil emulsion were added and thoroughly mixed to obtain a powdery dye composition.

100 parts by weight of the obtained dye composition was dissolved in 500 parts by weight of hot water, and the solution was cooled to 25° C. Then, 20 parts by weight of sodium hydroxide with 38° Baumé and 30 parts by weight of anhydrous Glauber's salt were added thereto, and water was further added to bring the total amount to 1,000 parts by weight. Immediately after the preparation of the dye bath, this bath was used as a padding bath, and cotton broad cloth was subjected to padding with squeezing rate of 65%, then wound up as it was, sealed in a polyethylene film and left to stand for 15 hours in a room at 25° C. Then, the dyed product was washed with cool water and hot water and further subjected to soaping treatment in a bath containing a cleaning agent at a temperature of from 95° to 98° C., and thereafter it was washed with water and dried to obtain an extremely dark red speckless dyed product.

No precipitation of the dye was observed even when the above padding solution was left to stand at 25° C. for 60 minutes. Further, padding of cotton poplin was conducted with this padding solution, whereby a uniform speckless extremely dark red dyed product was obtained.

EXAMPLE 10

To 70 parts by weight of a dye mixture as used in Example 9, 15 parts by weight of a condensation product of naphthalene sulfonic acid with formaldehyde (Demol N, manufactured by Kao Corporation), 14 parts by weight of sodium phosphate (crystals) and 1 part by weight of a mineral oil emulsion were added and thoroughly stirred to obtain a powdery dye composition. 80 parts by weight of the obtain dye composition, 50 parts by weight of urea, 550 parts by weight of a thickening agent (a low viscosity arginic acid 8% paste), 300 parts by weight of hot water and 20 parts by weight of sodium hydrogen carbonate were mixed to obtain a printing paste.

The obtained printing paste was stored at 25° C. for 12 hours and then printed to cotton broad cloth by a conventional method, followed by steaming treatment at 100° C. for 5 minutes. Then, washing with water, washing with hot water, soaping, washing with hot water, washing with water and drying were carried out to obtain a uniform extremely dark red dyed product.

Reference Example 3

To 70 parts by weight of a dye mixture as used in Example 9, 29 parts by weight of sodium sulfate (anhydrous) and 1 part by weight of a mineral oil emulsion were added and thoroughly mixed to obtain a powdery dye composition.

Using 100 parts by weight of the obtained dye composition, a padding bath was prepared in accordance with the dyeing method of Example 9, whereby precipitation of a part of the dye was observed. Using this padding bath, cold pad batch dyeing of cotton broad cloth was carried out under the same conditions as in Example 9, whereby a speckled red dyed product was obtained.

Reference Example 4

Using the dye composition obtained in Reference Example 3, a printing paste was prepared in accordance with Example 10, whereby the dye was precipitated. When printing was carried out, the color yield was low, and a dyed product obtained was speckled and practically useless.

EXAMPLES 11-1 TO 11-10 AND REFERENCE EXAMPLES 5 TO 7

The dyes identified in Table 4 were mixed in the amounts as identified in Table 4, and dyeing was carried out in the same manner as in Examples 8-1 to 8-3, whereby red dyed products excellent in both the buildup property and the leveling property were obtained. Each of the cloths dyed with 0.2 g of the respective composition, had light fastness of grade 5 and color fastness to perspiration of grade 4 to 5.

As a Reference Example, among compounds of the above formulas (III) and (IV), compounds identified in Table 4 were employed alone in an amount of 0.1 g, 0.2 g or 0.4 g, and dyeing was carried out in the same manner as in Examples 11-1 to 11-10, whereby in each case, both the buildup property and the leveling property were inferior to the results of Examples 11-1 to 11-10.

TABLE 4

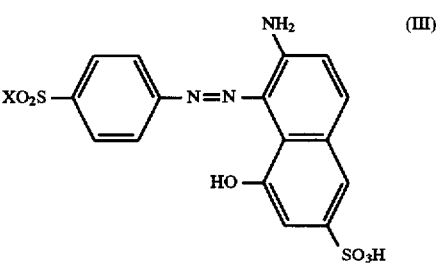
(II)

| No. | X | g |
|---|---|---|
| Example 11-1 | $-C_2H_4OSO_3H$ | 100 |
| Example 11-2 | $-C_2H_4OSO_3H$ | 70 |
| Example 11-3 | $-C_2H_4OSO_3H$ | 30 |
| Example 11-4 | $-CH=CH_2$ | 100 |
| Example 11-5 | $-C_2H_4Cl$ | 100 |
| Example 11-6 | $-C_2H_4OSO_3H$ | 100 |
| Example 11-7 | $-C_2H_4OSO_3H$ | 100 |
| Example 11-8 | $-C_2H_4OSO_3H$ | 100 |
| Example 11-9 | $-CH=CH_2$ | 100 |
| Example 11-10 | $-C_2H_4Cl$ | 100 |
| Reference Example 5 | $-C_2H_4OSO_3H$ | |
| Reference Example 6 | | |
| Reference Example 7 | | |

(III)

XO₂S—⟨phenyl⟩—N=N—⟨naphthalene with NH₂, HO, SO₃H⟩

| No. | X | g |
|---|---|---|
| Example 11-1 | $-C_2H_4OSO_3H$ | 100 |
| Example 11-2 | $-C_2H_4OSO_3H$ | 30 |
| Example 11-3 | $-C_2H_4OSO_3H$ | 70 |
| Example 11-4 | $-C_2H_4OSO_3H$ | 100 |
| Example 11-5 | $-CH=CH_2$ | 100 |
| Example 11-6 | — | — |
| Example 11-7 | — | — |
| Example 11-8 | — | — |
| Example 11-9 | — | — |
| Example 11-10 | — | — |
| Reference Example 5 | | |

TABLE 4-continued

| | | |
|---|---|---|
| Reference Example 6 | $-C_2H_4OSO_3H$ | |
| Reference Example 7 | | |

(IV)

⟨phenyl with SO₂X⟩—N=N—⟨naphthalene with NH₂, SO₃H, HO, SO₃H⟩

| No. | X | g |
|---|---|---|
| Example 11-1 | — | — |
| Example 11-2 | — | — |
| Example 11-3 | — | — |
| Example 11-4 | — | — |
| Example 11-5 | — | — |
| Example 11-6 | $-C_2H_4OSO_3H$ | 100 |
| Example 11-7 | $-C_2H_4OSO_3H$ | 30 |
| Example 11-8 | $-C_2H_4OSO_3H$ | 70 |
| Example 11-9 | $-C_2H_4OSO_3H$ | 200 |
| Example 11-10 | $-C_2H_4OSO_3H$ | 100 |
| Reference Example 5 | — | |
| Reference Example 6 | | |
| Reference Example 7 | $-C_2H_4OSO_3H$ | |

EXAMPLE 12

0.2 g of a dye mixture comprising 50 parts by weight of a dye having the following formula (a) in its free acid form:

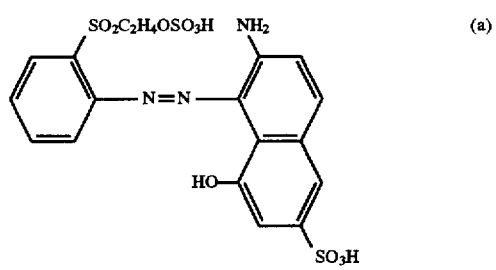
(a)

and 20 parts by weight of a dye having the following formula (a') in its free acid form:

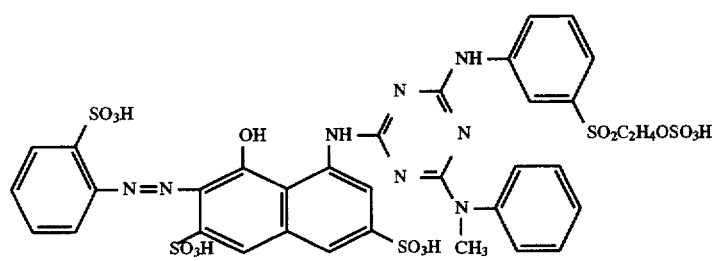

(a')

was dissolved in 200 ml of water. To this solution, 10 g of Glauber's salt was added and dissolved to obtain a dye bath (Glauber's salt concentration: 50 g/l). In this dye bath, 10 g of an unmercerized cotton knit fabric was immersed, and the temperature was raised to 60° C. over a period of 30 minutes. Then, 3 g of sodium carbonate was added thereto, and exhaustion dyeing was carried out at the same temperature for one hour. After dyeing, the dyed cloth was subjected to-washing with water, soaping and drying in accordance with conventional methods to obtain a red dyed cloth having excellent levelness. The light fastness, the color fastness to light and perspiration, the color fastness to chlorine and the leveling property of the obtained cloth were evaluated by the following methods, and the results are shown in Table 5.

①  Evaluation of the light fastness
JIS L-0842 80 hr

② Evaluation of the color fastness to light and perspiration

In accordance with JIS-0888 Method A, an alkaline method. (However, the amount of histidine was changed to 10 times as much.)

③ Evaluation of the color fastness to chlorine

Evaluated in accordance with JIS L-0884 (chlorine concentration: 20 ppm).

④ Evaluation of the leveling property

The dyed cloth was visually evaluated under the following standards.

◎: Excellent (uniformly dyed)
○: Uniformly dyed and practically acceptable
△: Slightly inferior
X: Not uniformly dyed, and irregularities distinctly observed.

EXAMPLES 13 AND 14 AND COMPARATIVE EXAMPLES 2 TO 4

In the method of Example 12, the blend ratio of the dye mixture was changed as identified in Table 5, and the same test as in Example 12 was carried out. The results are shown in Table 5.

As shown in Table 5, the dye mixtures of the Examples of the present invention provide the light fastness, the color fastness to light and perspiration and the color fastness to chlorine which are all excellent at levels of grade 4 or higher, and the dyed cloths thereby obtained had the leveling properties which are practically free from problems.

TABLE 5

| No. | Blend ratio of dyes (wt ratio) Dye (a) | Blend ratio of dyes (wt ratio) Dye (a') | Light fastness (grade) | Color fastness to light and perspiration (grade) | Color fastness to chlorines (grade) | Leveling property |
| --- | --- | --- | --- | --- | --- | --- |
| Example 12 | 71.4 | 28.6 | 5 | 4⁺ | 4⁺ | ○ |
| Example 13 | 50 | 50 | 4–5⁺ | 4⁺ | 4–5 | ○ |
| Example 14 | 30 | 70 | 4 | 4 | 4–5 | ○ |
| Comparative Example 2 | 100 | 0 | 5 | 4–5 | 3–4 | X |
| Comparative Example 3 | 0 | 100 | 3–4 | 3 | 5⁻ | ◎ |
| Comparative Example 4 | 95 | 5 | 5 | 4–5⁻ | 3–4⁺ | △ |

EXAMPLES 15-1 TO 15-26

In the method of Example 12, the reactive dye of the formula (a') was changed to the reactive dye of the formula in its free acid form as identified in Table 6, and the same test as in Example 12 was carried out, whereby the light fastness, the color fastness to light and perspiration and the color fastness to chlorine were all at levels of grade 4 or higher, and red dyed cloths having leveling properties being ○ were obtained.

TABLE 6

[Structure: naphthalene-azo-naphthol dye with SO₃H, OH, NH—Q, SO₃H groups and (SO₂Y)ₚ substituent]

[Structure showing the (SO₂Y)ₚ-substituted aryl group]

| No. | (SO₂Y)ₚ | —Q |
|---|---|---|
| 15-1 | 2-methylbenzenesulfonic acid (SO₃H) | triazine with NH-(3-SO₂C₂H₄OSO₃H-phenyl) and N(C₂H₅)-(4-Cl-phenyl) substituents |
| 15-2 | 2-methylbenzenesulfonic acid (SO₃H) | triazine with NH-(2-SO₂C₂H₄Cl-phenyl) and OH substituents |
| 15-3 | 2-methylbenzenesulfonic acid (SO₃H) | triazine with NH-(3-SO₂C₂H₄OSO₃H-phenyl) and N(C₂H₅)-(4-SO₂C₂H₄OSO₃H-phenyl) substituents |
| 15-4 | 2-methylbenzenesulfonic acid (SO₃H) | triazine with N(C₃H₇(n))-(3-SO₂C₂H₄OSO₃H-phenyl) and NH-(4-Br-phenyl) substituents |
| 15-5 | 2-methylbenzenesulfonic acid (SO₃H) | triazine with NH-(2-C₂H₅-phenyl) and F substituents |

TABLE 6-continued
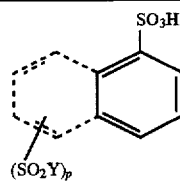
| No. | | -Q |
|---|---|---|
| 15-6 | 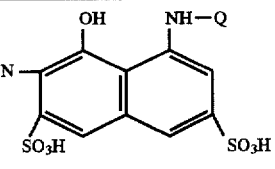 | 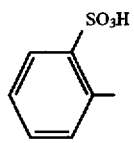 |
| 15-7 | | 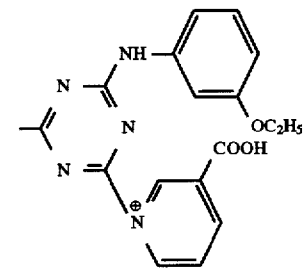 |
| 15-8 | | 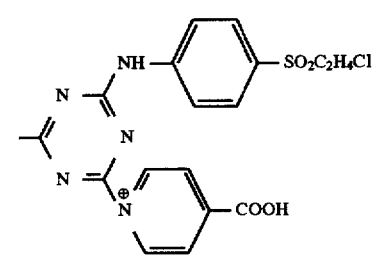 |
| 15-9 | | 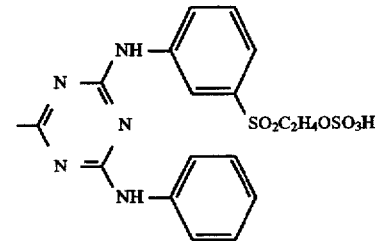 |
| 15-10 | | |

TABLE 6-continued
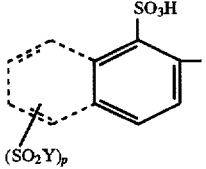
| No. | (SO₂Y)ₚ | —Q |
|---|---|---|
| 15-11 | 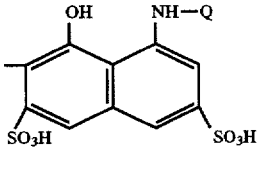 | 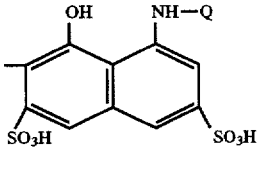 |
| 15-12 | 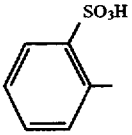 | 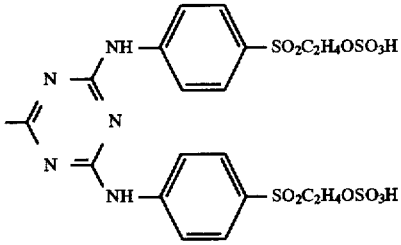 |
| 15-13 |  | 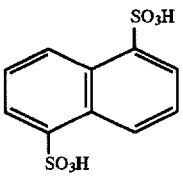 |
| 15-14 | 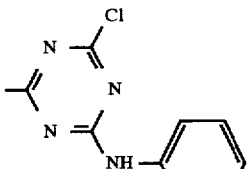 |  |
| 15-15 | 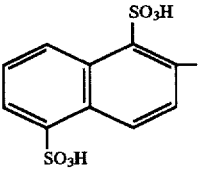 | 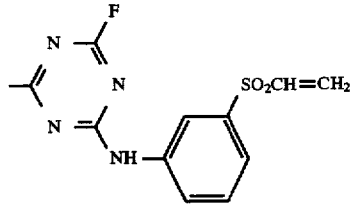 |

TABLE 6-continued
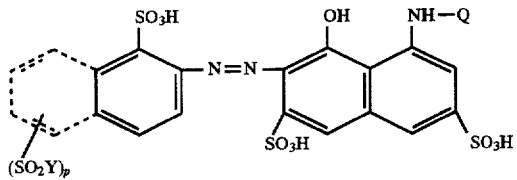
| No. | | -Q |
|---|---|---|
| 15-16 | 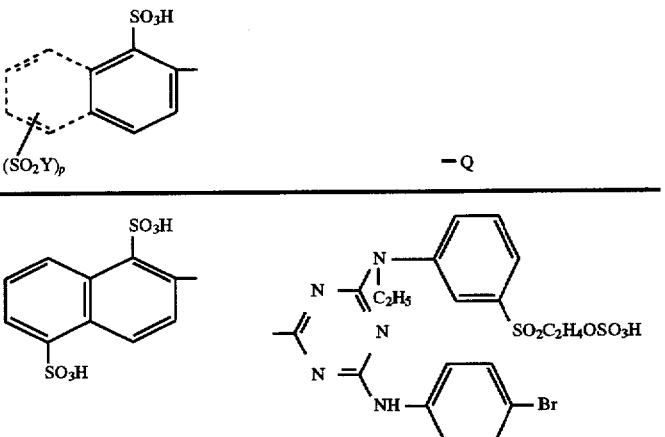 | |
| 15-17 | | |
| 15-18 | | |
| 15-19 | | |
| 15-20 | | |

TABLE 6-continued

| No. | (structure with SO₃H and (SO₂Y)ₚ on naphthalene, linked via N=N to naphthalene bearing OH, SO₃H, SO₃H, NH—Q) |  |
|---|---|---|
|   | (structure with SO₃H and (SO₂Y)ₚ on naphthalene) | —Q |
| 15-21 | HO₃SOH₄C₂O₂S — naphthalene — SO₃H | triazine with NH—C₆H₄—SO₂C₂H₄OSO₃H and F |
| 15-22 | naphthalene with SO₃H and SO₂C₂H₄OSO₃H | triazine with NH—C₆H₄—SO₂C₂H₄Cl and pyridinium-COOH |
| 15-23 | benzene-SO₃H | triazine with NH—C₆H₄—SO₂C₂H₄OSO₃H and N(C₂H₅)—C₆H₄—Cl |
| 15-24 | naphthalene with SO₃H and SO₃H | triazine with NH—C₆H₄—SO₂C₂H₄OSO₃H and N(C₂H₅)—C₆H₄—SO₂C₂H₄OSO₃H |
| 15-25 | naphthalene with SO₃H and SO₂C₂H₄OSO₃H | triazine with NH—C₆H₄—SO₂C₂H₄OSO₃H and NH—C₆H₄—COOH |

TABLE 6-continued

| No. | (SO₂Y)ₚ | −Q |
|---|---|---|
| 15-26 | naphthalene with SO₃H and SO₂C₂H₄OSO₃H | phenyl-NH-triazine(with CH₃ and F)-NH-C₆H₄-SO₂C₂H₄OSO₃H |

EXAMPLES 16-1 TO 16-18

In the method of Example 12, the reactive dye of the formula (a) was changed to the reactive dye of the formula as identified in Table 7, and the same test as in Example 12 was carried out, whereby the light fastness, the color fastness to light and perspiration and the color fastness to chlorine were all at levels of grade 4⁻or higher, and red dyed cloths having leveling properties being ○ were obtained.

TABLE 7

| No. | R¹—C₆H₄(SO₂X)— |
|---|---|
| 16-1 | HO₃SOH₄C₂O₂S—C₆H₄— (para) |
| 16-2 | H₃C—C₆H₃—SO₂C₂H₄OSO₃H |
| 16-3 | H₂C=CHO₂S—C₆H₄— (meta) |
| 16-4 | HO₃SOH₄C₂O₂S—C₆H₃—Br |
| 16-5 | HO₃SOH₄C₂O₂S—C₆H₃—OCH₃ |

TABLE 7-continued
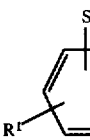
| No. | |
|-----|---|
| 16-6 | 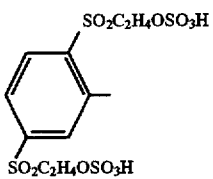 |
| 16-7 | 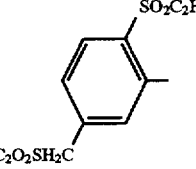 |
| 16-8 | 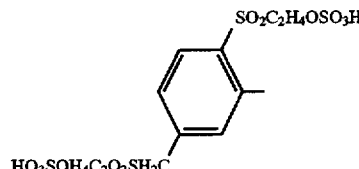 |
EXAMPLE 17
A dye mixture comprising 0.1 g of a dye having the following formula (a) in its free acid form, as a red component:
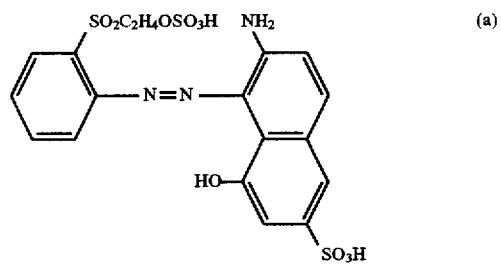
(a)
0.1 g of a dye having the following formula (b) in its free acid form as a yellow component;
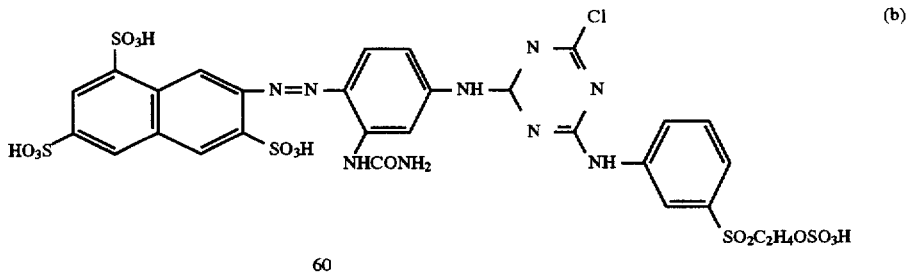
(b)
and 0.1 g of a dye having the following formula (c) in its free acid form as a blue component:

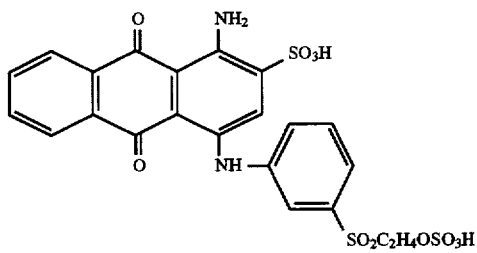

(c)

was dissolved in 200 ml of water. To this solution, 10 g of Glauber's salt was added; Then, 15 g of cotton cloth was immersed, and the temperature was raised from room temperature (25° C.) to 60° C. over a period of 30 minutes. Further, 4 g of anhydrous sodium carbonate was added thereto, followed by dyeing at 60° C. for one hour. Thereafter, washing with water, soaping, washing with water and drying were carried out in accordance with conventional methods, to obtain a brown dyed product. The reactive fixation property of each color component dye to the fibers in this dyeing was excellent, and the leveling properties were also excellent.

The light fastness and the color fastness to light and perspiration of the dyed cloth obtained in the above dyeing method, were evaluated by the following methods, and the results are shown in Table 8.

① Light fastness

In accordance with JIS L-0842 (irradiation for 40 hours)

② Color fastness to light and perspiration

In accordance with JIS-0888 Method A, using alkaline artificial perspiration

EXAMPLES 18 TO 20

Dyeing was carried out in the same manner as in Example 17 except that the blend ratio of the dyes was changed, whereby the dyed products as identified in Table 8 were obtained. As shown in Table 8, both the light fastness and the color fastness to light and perspiration were excellent.

Comparative Example 5

In Example 17, dyeing was conducted in the same manner except that the blue component dye was changed to a dye of the following known structural formula (d) which is disclosed as particularly excellent in the color fastness to light and perspiration in Japanese Unexamined Patent Publication No. 4783/1981. As shown in Table 8, the color fastness to light and perspiration was substantially poor.

TABLE 8

| No. | Blend ratio of the reactive dyes | | | | Color of the dyed product | Light fastness | Color fastness to light and perspiration |
|---|---|---|---|---|---|---|---|
| | a | b | c | d | | | |
| Example 17 | 0.1 | 0.1 | 0.1 | — | Brown | 5 | 4 |
| Example 18 | 0.1 | — | 0.16 | — | Reddish purple | 5 | 4 |
| Example 19 | 0.1 | 0.16 | 0.3 | — | Brown | 5 | 4 |
| Example 20 | 0.05 | 0.015 | — | — | Orange | 5 | 4 |
| Comparative Example 5 | 0.1 | 0.1 | — | 0.1 | Brown | 5 | 1-2 |

EXAMPLE 21

15g of each of the dyes (a), (b) and (c) disclosed in Example 17 was dissolved in 500 ml of hot water, and the solution was cooled to 25° C. To this solution, 5.5 g of a 32.5% sodium hydroxide aqueous solution and 150 g of water glass with 50° Baumé were added, and water was further added to bring the total amount to 1,000 g at 25° C. Immediately thereafter, this solution was used as a padding solution and a cotton woven fabric was subjected to padding. The fabric was wound up, then sealed in a polyethylene film and stored for 20 hours in a room at 20° C.

Thereafter, the dyed product was washed with cool water and hot water and subjected to soaping in a boiling soaping bath. It was further washed with cool water and dried to obtain a brown dyed product excellent in the light fastness at a level of grade 5 and the color fastness to light and perspiration at a level of grade 4.

EXAMPLES 22-1 TO 22-25

Dyeing was carried out in the same manner as in Example 17 except that the dyes (b) and (c) used in Example 17 were changed to the dyes as identified in Table 9 in the free acid form. As a result, dyed products having colors as identified in Table 9 having light fastness of grade 5 and color fastness to light and perspiration of grade 4, were obtained.

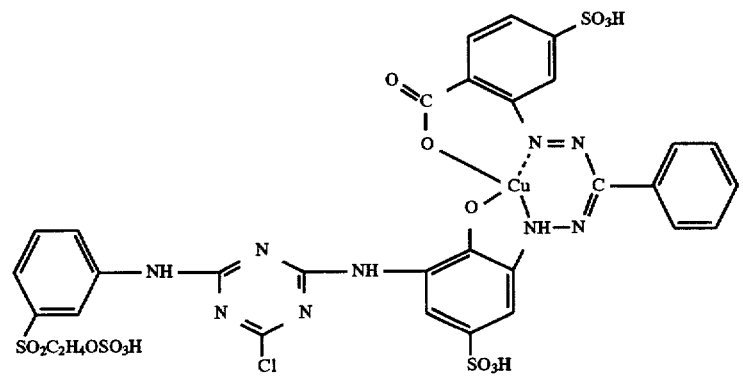

(d)

TABLE 9

| Example Nos. | (b) | Color of the dyed product |
|---|---|---|
| 22-1 | [structure: naphthalene with two SO$_3$H groups, azo-linked to phenyl with NHCONH$_2$ and NH-triazine (Cl, NH-phenyl-SO$_2$CH=CH$_2$)] | Brown |
| 22-2 | [structure: naphthalene with two SO$_3$H groups, azo-linked to phenyl with NHCONH$_2$ and NH-triazine (F, NHC$_3$H$_6$SO$_2$C$_2$H$_4$OSO$_3$H)] | Brown |
| 22-3 | [structure: naphthalene-trisulfonic acid azo-linked to CH(COCH$_3$)CONH-phenyl(SO$_3$H, OCH$_3$)-NH-triazine (Cl, NH-phenyl-SO$_2$C$_2$H$_4$OSO$_3$H)] <br> + <br> [structure: naphthalene-trisulfonic acid azo-linked to CH(COCH$_3$)CONH-phenyl(SO$_3$H, OCH$_3$)-NH-triazine (Cl, N(C$_2$H$_5$)-phenyl-SO$_2$C$_2$H$_4$OSO$_3$H)] <br> (1:1 mixture) | Brown |
| 22-4 | [structure: HO$_3$SOH$_4$C$_2$O$_2$S-phenyl(OCH$_3$, OCH$_3$)-N=N-C(COCH$_3$)(CONH-phenyl(OCH$_3$, SO$_3$H, CH$_3$))] | Brown |
| 22-5 | [structure: naphthalene with SO$_3$H groups, azo-linked to pyrazolone-type with N-phenyl-SO$_2$C$_2$H$_4$OSO$_3$H] | Brown |
| 22-6 | [structure: naphthalene with SO$_3$H and SO$_2$C$_2$H$_4$OSO$_3$H, azo-linked to pyrazolone-type with N-phenyl-SO$_2$C$_2$H$_4$OSO$_3$H] | Brown |

TABLE 9-continued
22-7 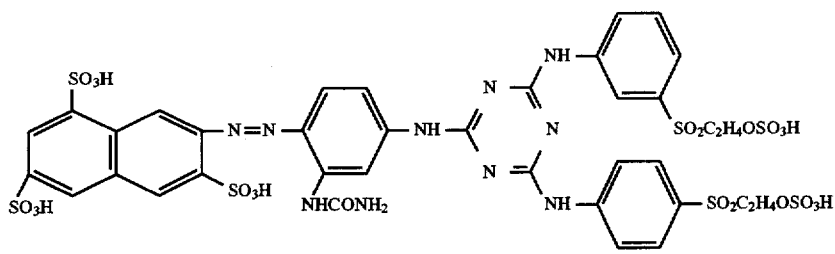 Brown
22-8 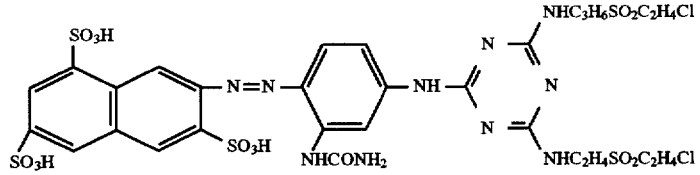 Brown
22-9 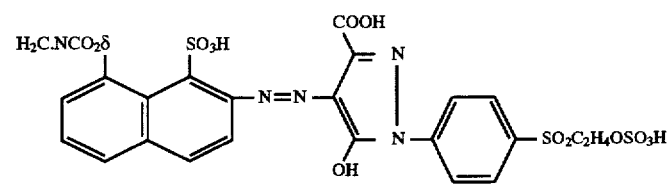 Brown
22-10 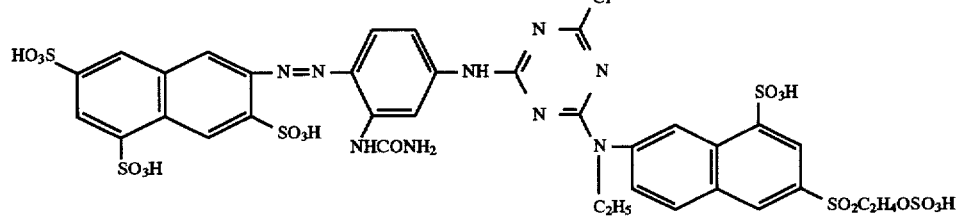 Brown
22-11 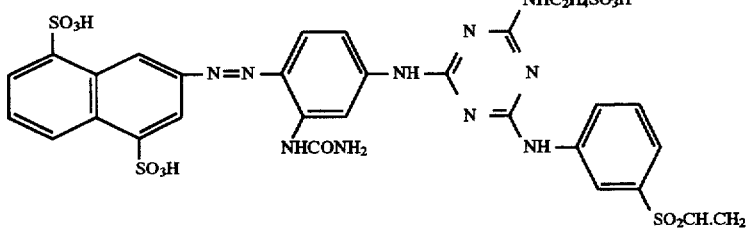 Brown
22-12 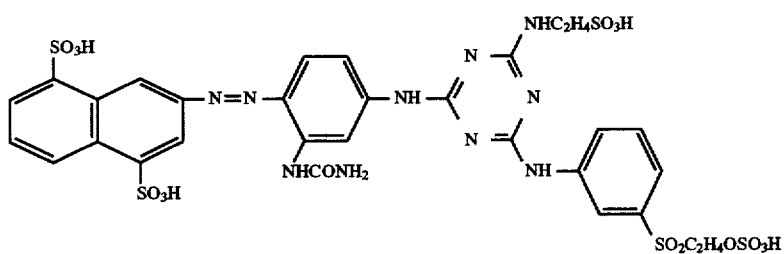 Brown
22-13 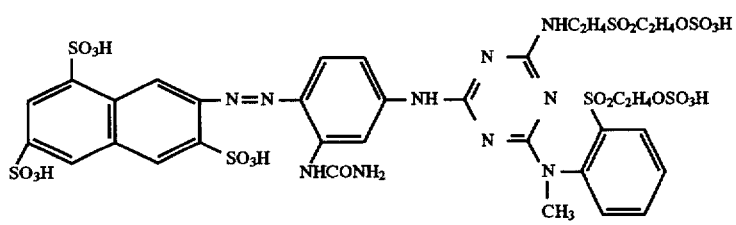 Brown TABLE 9-continued
| 22-14 | 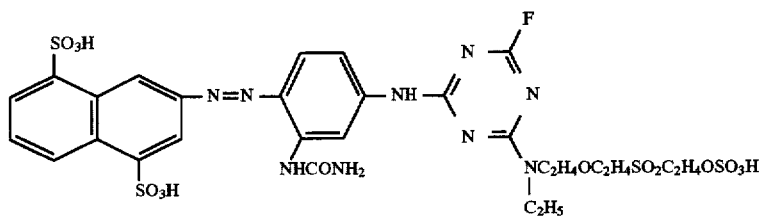 | Brown |
| 22-15 | 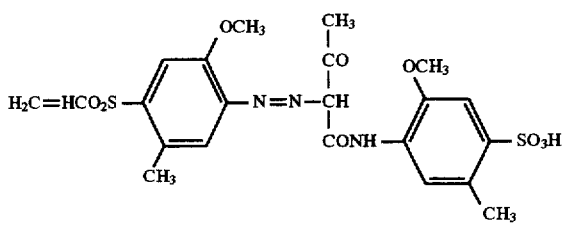 | Brown |
| 22-16 | 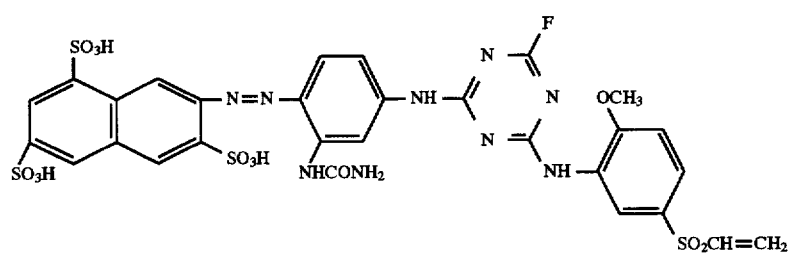 | Brown |
| 22-17 | 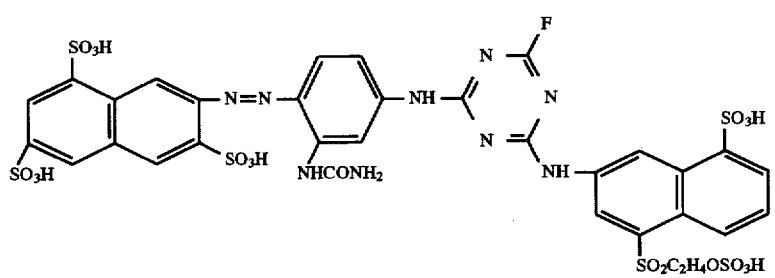 | Brown |
| 22-18 | 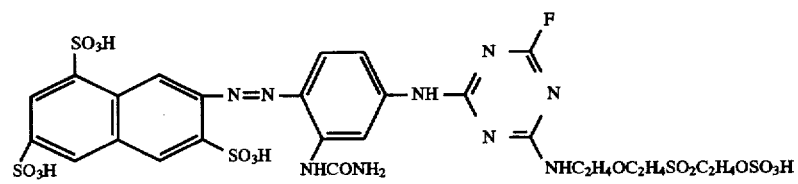 | Brown |
| 22-19 | 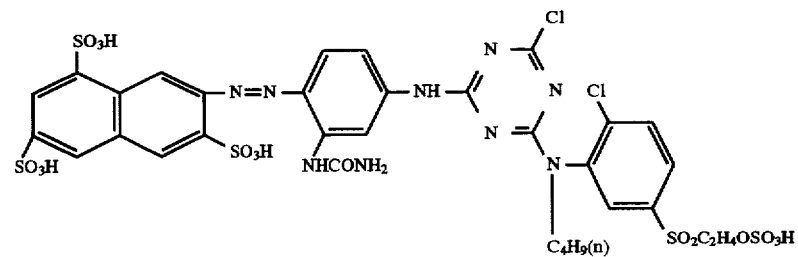 | Brown |

TABLE 9-continued

| | | |
|---|---|---|
| 22-20 | [structure] | Brown |
| 22-21 | [structure] | Brown |
| 22-22 | [structure] | Brown |
| 22-23 | [structure] | Brown |
| 22-24 | [structure] | Brown |
| 22-25 | [structure] | Brown |

TABLE 9-continued

| Example Nos. | (c) | Color of the dyed product |
|---|---|---|
| 22-1 | [anthraquinone structure with NH$_3$, SO$_2$H, and NH-phenyl-SO$_2$C$_2$H$_4$OSO$_3$H substituents] + [anthraquinone structure with NH$_2$, SO$_3$H, and NH-phenyl-SO$_2$C$_2$H$_4$OSO$_3$H substituents] (7:3) | Brown |
| 22-2 | [anthraquinone with NH$_2$, SO$_3$H, and NH-phenyl-SO$_2$C$_2$H$_4$OSO$_3$H] | Brown |
| 22-3 | [complex bis-triazine structure with dichloroquinone bridge, containing SO$_3$H groups and SO$_2$C$_2$H$_4$OSO$_3$H groups] | Brown |
| 22-4 | [anthraquinone with NH$_2$, SO$_3$H, and NH-(COOH, SO$_2$C$_2$H$_4$OSO$_3$H)-phenyl substituents] | Brown |
| 22-5 | [anthraquinone with NH$_2$, SO$_3$H, and NH-phenyl-SO$_2$C$_2$H$_4$OSO$_3$H] | Brown |

TABLE 9-continued

| No. | Structure | Color |
|---|---|---|
| 22-6 | (structure: dioxazine with HOSO$_2$OC$_2$H$_4$NH– and HOSO$_3$C$_2$H$_4$SO$_2$– on left aniline; –SO$_2$C$_2$H$_4$OSO$_3$H and –NHC$_2$H$_4$OSO$_3$H on right aniline; central dichloro-dioxazine core) | Brown |
| 22-7 | Example 22-1  Example 22-6<br>(c):(c)<br>1:1 mixture | Brown |
| 22-8 | (structure: bis-triazine linked dioxazine; left: 2,5-disulfoaniline–NH–triazine(F)–NHC$_3$H$_6$NH– connected to dioxazine core with SO$_3$H, Cl substituents; right side mirror: –NHC$_3$H$_6$NH–triazine(F)–NH–2,5-disulfoaniline) | Brown |
| 22-9 | Example 22-2  Example 22-7<br>(c):(c)<br>(1:1 mixture) | Brown |
| 22-10 | Example 22-6  Example 22-12<br>(c):(c)<br>(1:1 mixture) | Brown |
| 22-11 | (structure: 1-amino-2-sulfo-4-(3-(β-sulfatoethylsulfonyl)anilino)anthraquinone) | Brown |
| 22-12 | (structure: dioxazine with HOOCH$_4$C$_2$OCHNH$_4$C$_2$HN– and HO$_3$SOH$_4$C$_2$O$_2$S– on left aniline; –SO$_2$C$_2$H$_4$OSO$_3$H and –NHC$_2$H$_4$NHCOC$_2$H$_4$COOH on right aniline; dichloro-dioxazine core) | Brown |
| 22-13 | Example 22-1 (c) | Brown |
| 22-14 | Example 22-1 (c) | Brown |
| 22-15 | Example 22-6 (c) | Brown |
| 22-16 | Example 22-1  Example 22-3<br>(c):(c)<br>(1:1 mixture) | Brown |

TABLE 9-continued

| No. | Structure | Color |
|---|---|---|
| 22-17 | (structure shown) | Brown |
| 22-18 | Example 22-1 (c) | Brown |
| 22-19 | (structure shown) | Brown |
| 22-20 | Example 22-1 (c)  Example 22-6 (c)  Example 22-12 (c)  (1:1:1 mixture) | Brown |
| 22-21 | (structure shown) | Brown |
| 22-22 | Example 22-1 (c) | Brown |
| 22-23 | (structure shown) | Brown |
| 22-24 | Example 22-2 (c) : Example 22-19 (c)  (2:1 mixture) | Brown |

TABLE 9-continued

| 22-25 | 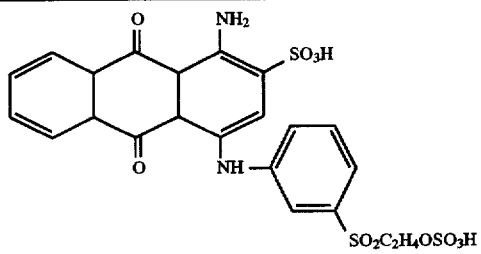 | Brown |

EXAMPLES 23-1 TO 23-13

Dyeing was carried out in the same manner as in Example 17 except that the dye (a) used in Example 17 was changed to the dye as identified in Table 10 in the free acid form. As a result, the dyed products having colors as identified in Table 10 and having light fastness of grade 5 and color fastness to light and perspiration of grade 3 to 4 or higher, were obtained.

TABLE 10

| Example Nos. | (a) | Color of the dyed product |
|---|---|---|
| 23-1 | | Brown |
| 23-2 | | Brown |
| 23-3 | | Brown |
| 23-4 | | Brown |

TABLE 10-continued
| Example Nos. | (a) | Color of the dyed product |
|---|---|---|
| 23-5 | 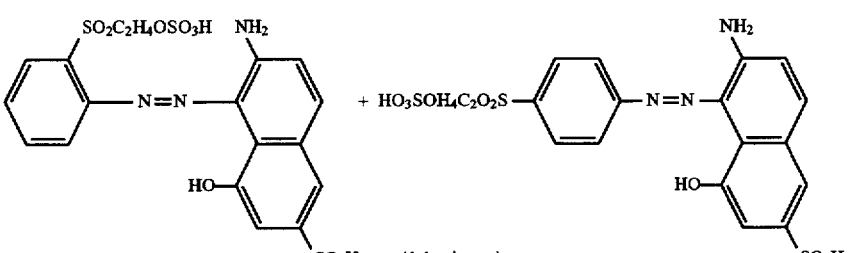 (1:1 mixture) | Brown |
| 23-6 | 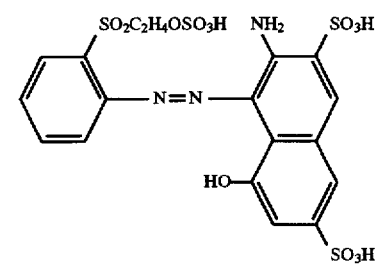 | Brown |
| 23-7 | 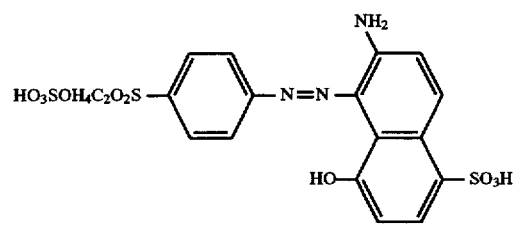 | Brown |
| 23-8 | 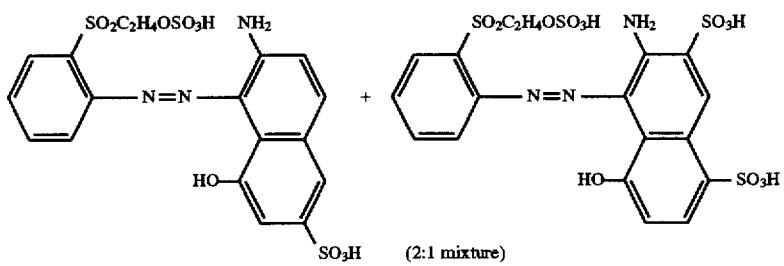 (2:1 mixture) | Brown |
| 23-9 | 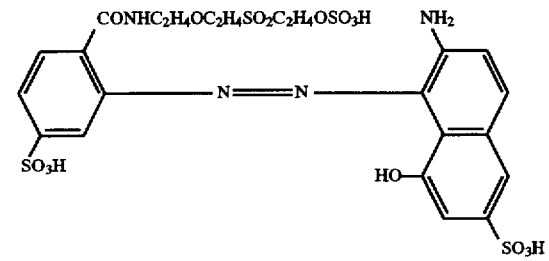 | Brown |

TABLE 10-continued

| Example Nos. | (a) | Color of the dyed product |
|---|---|---|
| 23-10 | [structure: bis(SO$_2$C$_2$H$_4$OSO$_3$H)-phenyl—N=N—naphthyl with NH$_2$, SO$_3$H, HO, SO$_3$H] | Brown |
| 23-11 | [structure: phenyl bearing SO$_2$C$_2$H$_4$OSO$_3$H and HO$_3$SH$_2$C—N=N—naphthyl with NH$_2$, SO$_3$H, HO, SO$_3$H] | Brown |
| 23-12 | [structure: phenyl with CON(C$_2$H$_4$SO$_2$C$_2$H$_4$Cl)$_2$ and SO$_3$H—N=N—naphthyl with NH$_2$, HO, SO$_3$H] | Brown |
| 23-13 | [structure: (H$_2$C=HCO$_2$SH$_6$C$_3$)$_2$NOC—phenyl(SO$_3$H)—N=N—naphthyl with NH$_2$, SO$_3$H, HO, SO$_3$H] | Brown |

The present invention is capable of dyeing fiber materials with colors excellent in the light fastness, the color fastness to light and perspiration and the color fastness to chlorine. Particularly, it is capable of dyeing cellulose fibers with desired colors which are excellent not only in the wet fastness but also in the light fastness and the color fastness to light and perspiration and thus capable of providing dyed fiber products such as clothings for sports which are durable against use under severe conditions. Thus, the contribution of the present invention to the dyeing industry is substantial.

We claim:

1. A red reactive dye having the following formula (I) in its free acid form:

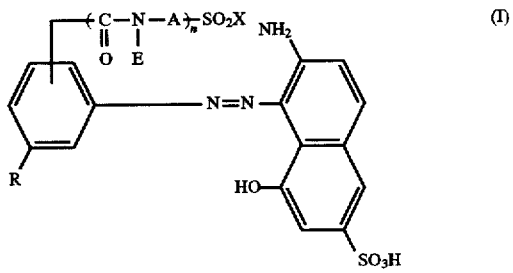

wherein X is —CH=CH$_2$ or —C$_2$H$_4$W (wherein W is a group splittable by alkali), A is a C$_{2-3}$ alkylene group or a C$_{2-3}$ alkylenoxy C$_{2-3}$ alkylene group, E is a hydrogen atom, a C$_{1-3}$ alkyl group or —A—SO$_2$X (wherein A and X are as defined above), n is 0 or 1, and R is —OH, —COOH, —SO₃H, or —CH₂SO₃H, provided that when n is 0, R is not —SO₃H.

2. The red reactive dye according to claim 1, wherein n is 0, X is —C₂H₄OSO₃H and R is —OH, —COOH or —CH₂SO₃H.

3. The red reactive dye according to claim 2, wherein R is —COOH.

4. The red reactive dye according to claim 2, which has the following formula (I-a) or (I-b) in its free acid form

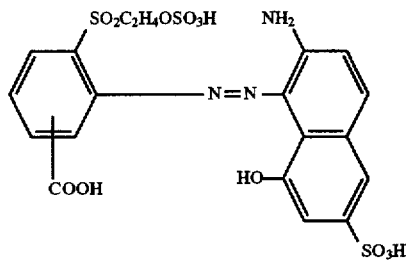

5. The red reactive dye according to claim 1, wherein n is 1, E is a hydrogen atom or a C₁₋₃ alkyl group and R is —COOH, —SO₃H or —CH₂SO₃H.

6. The red reactive dye according to claim 5, wherein E is a hydrogen atom, a methyl group or an ethyl group.

7. The red reactive dye according to claim 5, which has the following formula (I-c) or (I-d) in its free acid form

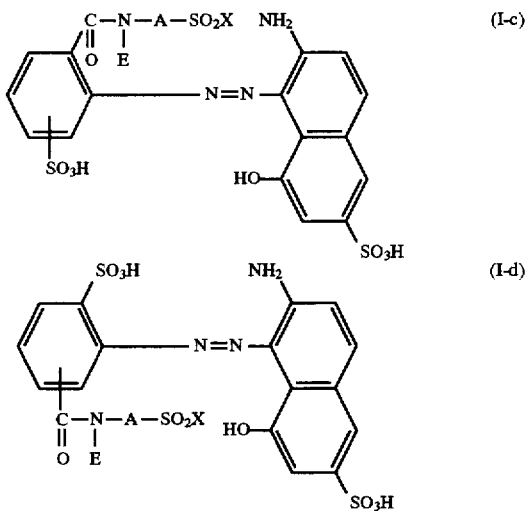

wherein E is a hydrogen atom, a methyl group or an ethyl group.

* * * * *

UNITED STATES PATENT AND TRADEMARK OFFICE
CERTIFICATE OF CORRECTION

PATENT NO. : 5,756,690
DATED : May 26, 1998
INVENTOR(S) : Toshio HIHARA, et al.

It is certified that error appears in the above-indentified patent and that said Letters Patent is hereby corrected as shown below:

On the title page, in Item [30], the Foreign Application Priority Data, the first listing is incorrect. It should read:

-- Aug. 23, 1993   [JP]    Japan..........5-229439 --

Signed and Sealed this

Tenth Day of November 1998

*Attest:*

*Attesting Officer*

BRUCE LEHMAN

*Commissioner of Patents and Trademarks*